United States Patent
Takahashi (10) Patent No.: US 11,330,143 B2
(45) Date of Patent: May 10, 2022

(54) COMMUNICATION DEVICE AND COMMUNICATION METHOD FOR TRANSMITTING DIVIDE FILES

(71) Applicant: SHARP KABUSHIKI KAISHA, Sakai (JP)

(72) Inventor: Satoshi Takahashi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/467,419

(22) Filed: Sep. 6, 2021

(65) Prior Publication Data

US 2022/0103715 A1 Mar. 31, 2022

(30) Foreign Application Priority Data

Sep. 28, 2020 (JP) .............................. JP2020-162243

(51) Int. Cl.
*H04N 1/32* (2006.01)
*H04N 1/00* (2006.01)

(52) U.S. Cl.
CPC ..... *H04N 1/32454* (2013.01); *H04N 1/00214* (2013.01); *H04N 1/32368* (2013.01); *H04N 1/32117* (2013.01); *H04N 2201/3208* (2013.01)

(58) Field of Classification Search
CPC ........... H04N 1/32454; H04N 1/00214; H04N 1/32368; H04N 1/32117; H04N 2201/3208
See application file for complete search history.

(56) References Cited

U.S. PATENT DOCUMENTS

2002/0027675 A1* 3/2002 Minato .............. H04N 1/00214
358/440

FOREIGN PATENT DOCUMENTS

JP 2001-350700 A 12/2001

* cited by examiner

*Primary Examiner* — Nicholas Pachol
(74) *Attorney, Agent, or Firm* — ScienBiziP, P.C.

(57) ABSTRACT

A communication device including: a transmission file setter which sets an upper limit value of a capacity of a file transmittable by e-mail; a transmission page setter which sets a page count of a transmission file; a communicator which divides, when the transmission file including multiple pages exceeds the upper limit value, the transmission file into multiple divided transmission files, and transmits the divided transmission files; a transmission setter which receives a combining configuration file for combining the divided transmission files, and the setting of a combining tool; and a controller which controls the transmission file setter, the transmission page setter, and the communicator. When the communicator transmits the plurality of divided transmission files, the controller causes the communicator to also transmit the combining configuration file and the combining tool for creating a file of the page count, in accordance with the setting of the transmission setter.

6 Claims, 9 Drawing Sheets

SETTING OF COMBINING TOOL

TRANSMISSION SETTING OF COMBINING TOOL
☑ ATTACH COMBINING TOOL TO MAIL
☐ DO NOT ATTACH COMBINING TOOL TO MAIL

DOWNLOAD OF COMBINING TOOL

DOWNLOAD

COMBINING OF FILES

EXECUTE COMBINING

FIG. 6

TRANSMISSION FILE 1

TRANSMISSION FILE 2

TRANSMISSION FILE 1

TRANSMISSION FILE 2

FIG. 10

SETTING OF COMBINING TOOL

TRANSMISSION SETTING OF COMBINING TOOL
☑ ATTACH COMBINING TOOL TO MAIL
  ☑ ATTACH EVERY TIME
☐ DO NOT ATTACH COMBINING TOOL TO MAIL

DOWNLOAD OF COMBINING TOOL

[DOWNLOAD]

COMBINING OF FILES
[EXECUTE COMBINING]

COMMUNICATION DEVICE AND COMMUNICATION METHOD FOR TRANSMITTING DIVIDE FILES

BACKGROUND OF THE INVENTION

Field of the Invention

The present invention relates to a communication device and a communication method, and more particularly, to a communication device and a communication method having the function of sending a file containing an image or the like by e-mail.

Description of the Background Art

In an apparatus such as a multifunction peripheral, when an image is to be sent by e-mail, there are cases where a file to be sent exceeds a predetermined upper limit of a transmittable file capacity, and thus the file cannot be sent.

Communication devices which perform the function of dividing the file and transmitting the divided files when such a problem occurs have been known.

As an invention of a communication device having such a file dividing function, an invention of a data communication device, which performs transmission by either dividing the transmission into that by a plurality of e-mails, or reducing the amount of data of image data, in a case where the amount of data exceeds an upper limit value which has been set in advance by an operator, has been disclosed (see, for example, Japanese Unexamined Patent Application Publication No. 2001-350700).

Meanwhile, in the case of a communication device for which an upper limit size of a transmittable file capacity in a single e-mail is determined, and which has the function of dividing and creating a file by a page count specified by the user, the upper limit of the transmittable file capacity is prioritized, and the setting of the page count specified by the user may become invalidated.

As a result, there has been a problem that the transmission is performed by a page count not desired by the user.

The present invention has been conceived in consideration of the above circumstances, and an object of the present invention is to provide a communication device and a communication method for transmitting files such that a recipient can obtain a file of a page count specified by the user even in a case where the file exceeds an upper limit of a transmittable file capacity.

SUMMARY OF THE INVENTION (1) The present invention provides a communication device which includes: a transmission file setter which sets an upper limit value of a file capacity transmittable by e-mail; a transmission page setter which sets a page count of a transmission file; a communicator which divides, when a transmission file including a plurality of number of pages exceeds the upper limit value of the file capacity, the transmission file into a plurality of divided transmission files whose capacity does not exceed the upper limit value, and transmits the plurality of divided transmission files to a specified address; a transmission setter which receives a combining configuration file for combining the plurality of divided transmission files, and the setting of a combining tool; and a controller which controls the transmission file setter, the transmission page setter, and the communicator, in which when the communicator divides the transmission file and transmits the plurality of divided transmission files to the specified address, the controller is characterized by causing the communicator to also transmit the combining configuration file and the combining tool for creating a file of the page count set by the transmission page setter, in accordance with the setting of the transmission setter.

Also, the present invention provides a communication method which includes: a transmission file setting step of setting an upper limit value of a file capacity transmittable by e-mail; a transmission page setting step of setting a page count of a transmission file; a division transmission step of dividing, when a transmission file including a plurality of number of pages exceeds the upper limit value of the file capacity, the transmission file into a plurality of divided transmission files whose capacity does not exceed the upper limit value, and transmitting the plurality of divided transmission files to a specified address; and a transmission setting step of receiving a combining configuration file for combining the plurality of divided transmission files, and the setting of a combining tool, in which in the division transmission step, when the transmission file is divided and the plurality of divided transmission files are transmitted to the specified address, the communication method is characterized in that the combining configuration file and the combining tool for creating a file of the page count set in the transmission page setting step are also transmitted, in accordance with the setting of the transmission setting step.

In the present invention, the "communication device" refers to a device having the function of transmitting a file containing an image or the like, such as an e-mail, to an external device.

According to the present invention, a communication device and a communication method, which enable a recipient to obtain a transmission file of a page count set by a sender even in a case where the transmission file must be divided due to the file exceeding an upper limit of a transmittable file capacity, are realized.

Further, preferred modes of the present invention will be described.

(2) The controller may be one which causes the communicator to also transmit, to the specified address, address information of a website from which the combining configuration file and the combining tool can be obtained, in accordance with the setting of the transmission setter.

By such a configuration, even in a case where a transmission file must be divided due to the file exceeding an upper limit of a transmittable file capacity, as the combining configuration file and the combining tool acquired from a prescribed website are used, a communication device which enables a recipient to obtain the transmission file of a page count set by a sender is realized.

(3) The transmission setter may be one which receives, when the communicator divides the transmission file and transmits the plurality of divided transmission files, the setting of whether to transmit the combining tool for each instance of transmission.

By such a configuration, even in a case where a transmission file must be divided due to the file exceeding an upper limit of a transmittable file capacity, as the combining tool is transmitted for each instance of transmission, a communication device which enables a recipient to obtain the transmission file of a page count set by a sender is realized.

(4) The communication device may be one which further includes a storage which stores the combining tool in a way that is accessible from outside.

By such a configuration, even in a case where a transmission file must be divided due to the file exceeding an upper limit of a transmittable file capacity, as the combining tool that is accessible from outside is provided, a communication device which enables a recipient to obtain the transmission file of a page count set by a sender is realized.

(5) The communication device may be one which further includes: a storage which stores the combining configuration file and the combining tool; a display which displays a page where the combining configuration file and the combining tool can be specified; and an operator which receives an operation of a user, in which when the communicator receives the plurality of divided transmission files, the display may be made to display the page where the combining configuration file and the combining tool can be specified, and the plurality of divided transmission files may be combined on the basis of the operation of the user.

By such a configuration, even in a case where a transmission file must be divided due to the file exceeding an upper limit of a transmittable file capacity, as prescribed combining configuration file and combining tool stored in the storage are specified, a communication device which enables a recipient to obtain the transmission file of a page count set by a sender is realized.

DESCRIPTION OF THE PREFERRED EMBODIMENTS

The present invention will be described in more detail with reference to the accompanying drawings.

Note that the description given below is illustrative in all respects, and should not be construed as limiting the present invention.

Embodiment 1

A digital multifunction peripheral 1, which is an embodiment of an image forming apparatus according to the present invention, will be described with reference to FIGS. 1 and 2.

Figure 1:
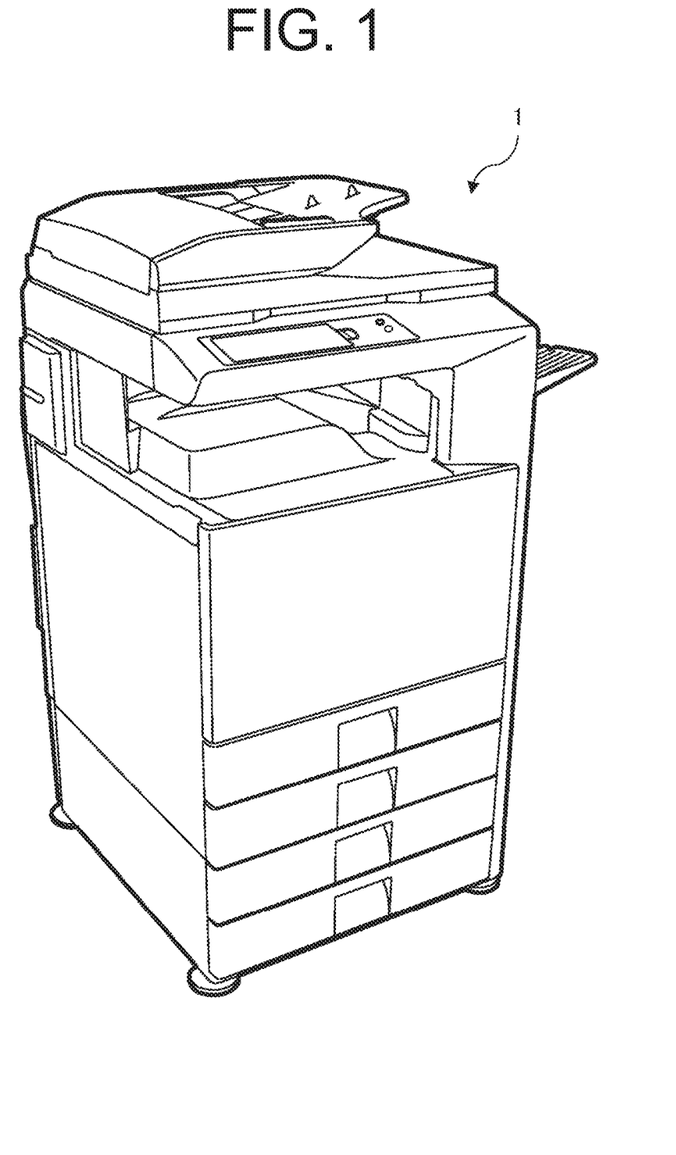
FIG. 1 is a perspective view showing the outer appearance of a digital multifunction peripheral according to Embodiment 1 of the present invention.

FIG. 1 is a perspective view showing the outer appearance of the digital multifunction peripheral 1 according to Embodiment 1 of the present invention. Further, FIG. 2 is a block diagram showing a schematic configuration of the digital multifunction peripheral 1 illustrated in FIG. 1.

Note that the present invention is not limited to the digital multifunction peripheral 1, but is applicable to all devices having an image reading function and an e-mail transmission function.

The digital multifunction peripheral 1 is a device such as a multifunction peripheral (MFP) which digitally processes image data, and has a copy function, a scanner function, and a facsimile function.

The digital multifunction peripheral 1 executes jobs such as scanning, printing, copying or image transmission (Scan to Email or Scan to FTP), on the basis of an instruction from the user received via an operator 172 and a communicator 15.

Figure 2:
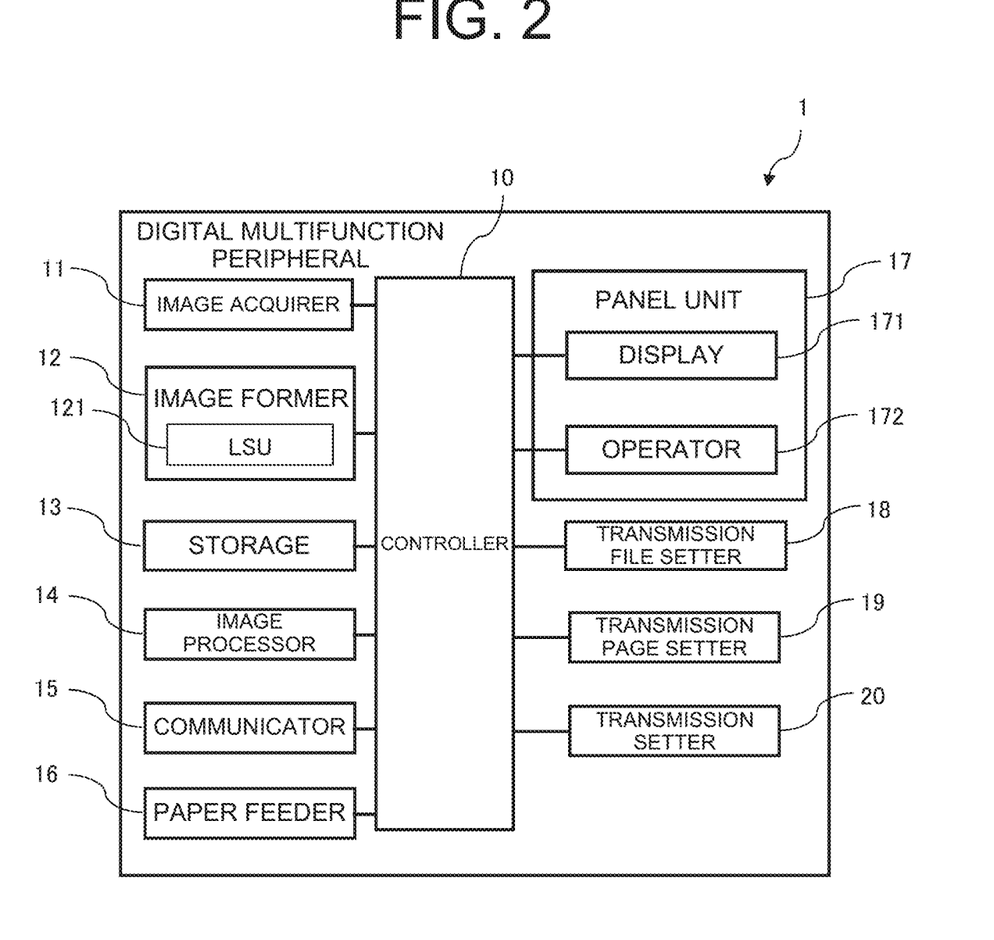
FIG. 2 is a block diagram showing a schematic configuration of the digital multifunction peripheral illustrated in FIG. 1.

As shown in FIG. 2, the digital multifunction peripheral 1 is provided with a controller 10, an image acquirer 11, an image former 12, a storage 13, an image processor 14, the communicator 15, a paper feeder 16, a panel unit 17, a transmission file setter 18, a transmission page setter 19, and a transmission setter 20.

Each of the constituent elements of the digital multifunction peripheral 1 will now be described.

The controller 10 controls the digital multifunction peripheral 1 in an integrated manner, and is configured from a CPU, a RAM, a ROM, various interface circuits, and the like.

In order to control the operation of the digital multifunction peripheral 1 as a whole, the controller 10 monitors and controls detection of each sensor, and all loads on a motor, a clutch, the panel unit 17, and the like.

The image acquirer 11 is a portion which detects and reads a document placed on a document table or a document conveyed from a document tray, and generates image data. Also, the above image acquirer 11 is a portion which acquires image data generated by, for example, an external information processing apparatus (not shown) or facsimile machine (not shown).

Note that when image data is to be acquired from an external information processing apparatus or the like, the image data may be acquired via a wired or wireless network, or the image data recorded on a USB stick or the like may be acquired. Further, the image data acquisition may be performed by a combination of the above methods.

The image former 12 is a portion which prints and outputs the image data generated by the image processor 14 on a sheet of paper, and is provided with an LSU 121.

The LSU 121 is a device which irradiates a surface of a photosensitive drum in an electrically charged state with a laser beam corresponding to image information consisting of digital signals acquired by the image acquirer 11, thereby forming an electrostatic latent image.

The storage 13 is an element or a storage medium which stores information necessary for implementing various functions of the digital multifunction peripheral 1, and a control program, etc. For example, a semiconductor device such as a RAM and a ROM, and a storage medium such as a hard disk, a flash storage, or an SSD are used.

Note that a program and data may be held in different devices, such as that an area for holding the data is configured by a hard disk drive, and an area for holding the program is configured by a flash storage.

The image processor 14 is a portion which converts a document image that has been read by the image acquirer 11 into appropriate electrical signals to generate image data, and performs processing to make the image data input from the image acquirer 11 suitable for output, such as enlargement and reduction, in accordance with a command from the operator 172.

The communicator 15 is a portion which communicates with a computer, a portable information terminal, an external information processing apparatus or facsimile machine, or the like, via a network, etc., and transmits and receives various kinds of information such as e-mails and facsimile to and from such external communication devices.

The paper feeder 16 is a portion which conveys a sheet of paper stored in a paper feed cassette or a manual feed tray to the image former 12.

The panel unit 17 is provided with a display 171 and the operator 172.

The display 171 is a portion which displays various kinds of information. The display 171 is constituted of, for example, a CRT display, a liquid crystal display, or an EL display, and is a display device such as a monitor or a line display for an operating system or application software to display electronic data such as the processing state. The controller 10 displays the operation and the state of the digital multifunction peripheral 1 through the display 171.

The operator 172 is a portion which is provided with a touch panel, and receives a command from the user.

The transmission file setter 18 is a portion which sets an upper limit value of a capacity of a file that the communicator 15 can transmit by e-mail.

The transmission page setter 19 is a portion which receives the setting of a page count of a transmission file, which is the file to be transmitted by e-mail, by the user.

The transmission setter 20 is a portion which receives a combining configuration file for combining a plurality of divided transmission files, and the setting of a combining tool.

Processing at the Time of File Transmission

Next, with reference to FIGS. 3 to 9, processing at the time of file transmission of the digital multifunction peripheral 1 according to Embodiment 1 of the present invention will be described.

Figure 3:
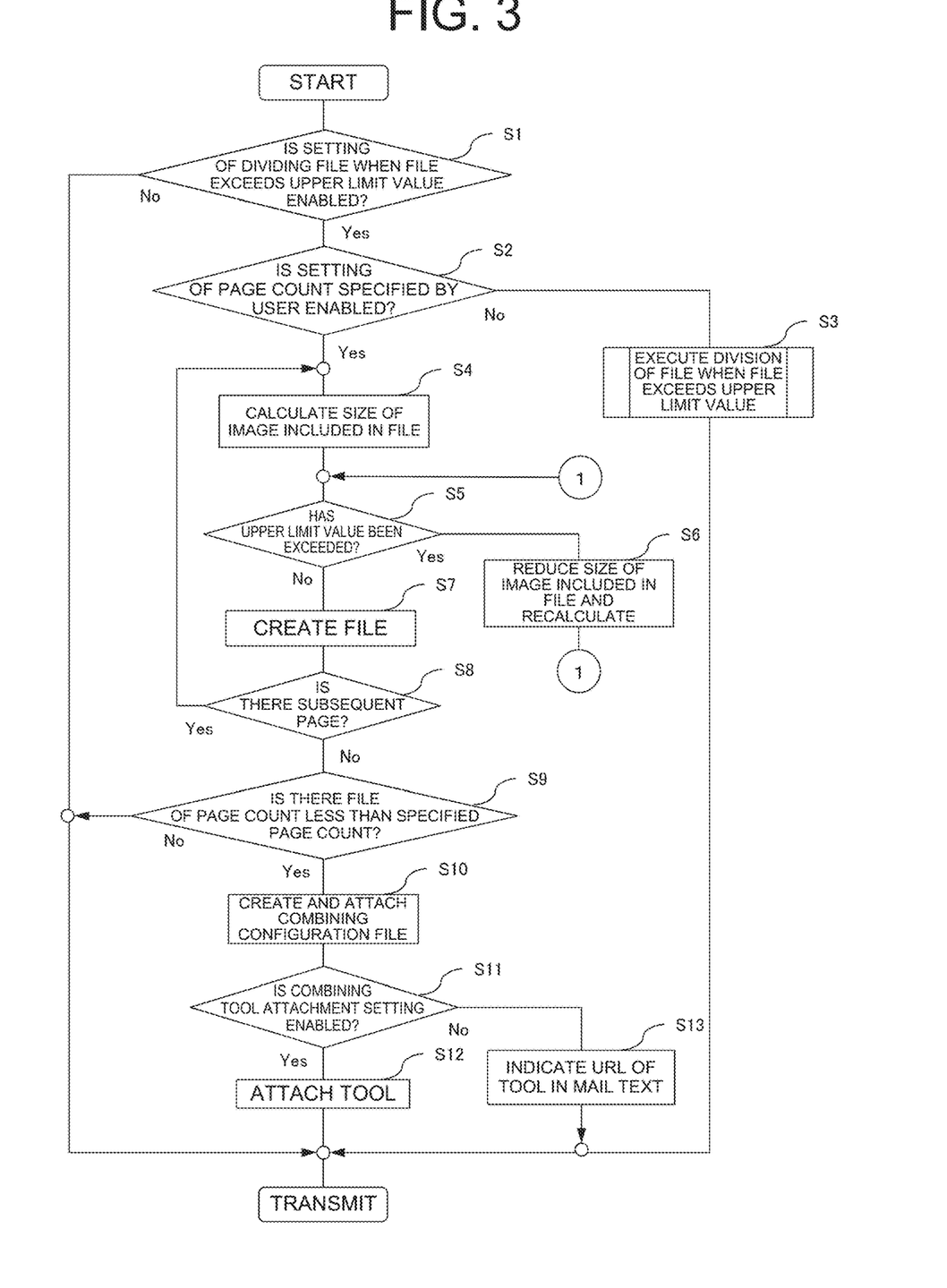
FIG. 3 is a flowchart illustrating an example of a flow of processing at the time of file transmission of the digital multifunction peripheral shown in FIG. 1.

FIG. 3 is a flowchart illustrating an example of a flow of processing at the time of file transmission of the digital multifunction peripheral 1 shown in FIG. 1.

In step S1 of FIG. 3, the controller 10 determines whether the setting of ordering that transmission should be performed by dividing a file when the file exceeds a preset upper limit value of a transmittable file capacity is enabled or not (step S1).

If the setting of ordering that transmission should be performed by dividing a file when the file exceeds the upper limit value of the file capacity is not enabled (i.e., if the determination of step S1 is No), the controller 10 transmits the received file as it is.

Meanwhile, if the setting of ordering that transmission should be performed by dividing a file when the file exceeds the upper limit value of the file capacity is enabled (i.e., if the determination of step S1 is Yes), the controller 10 determines, in step S2, whether the setting of ordering that a file should be created by a page count specified by the user is enabled or not (step S2).

If the setting of ordering that a file should be created by the page count specified by the user is not enabled (if the determination of step S2 is No), in step S3, the controller 10 executes processing of dividing the file when the capacity of the file exceeds the upper limit value, on the basis of a predetermined setting (step S3).

Meanwhile, if the setting of ordering that a file should be created by the page count specified by the user is enabled (if the determination of step S2 is Yes), in step S4, the controller 10 calculates the size of an image to be included in the file (step S4).

Then, in step S5, the controller 10 determines whether the file capacity has exceeded the upper limit value or not (step S5).

If the file capacity has exceeded the upper limit value (i.e., if the determination of step S5 is Yes), in step S6, the controller 10 reduces the size of the image to be included in the file, and then recalculates the size (step S6).

Here, in a case where the transmission file exceeds the upper limit value of the file capacity if the file is set to a page count as specified by the user, the page count of the file is divided such that the file capacity does not exceed the limit.

After that, the controller 10 returns the processing to the determination of step S5 (step S5).

Next, in step S5, if the file capacity does not exceed the upper limit value (i.e., if the determination of step S5 is No), in step S7, the controller 10 creates a file (step S7).

Next, in step S8, the controller 10 determines whether there is a subsequent page or not (step S8).

If there is a subsequent page (i.e., if the determination of step S8 is Yes), the controller 10 returns the processing to step S4, and performs similar processing for the subsequent page.

Meanwhile, if there is no subsequent page (i.e., if the determination of step S8 is No), the controller 10 determines, in step S9, whether or not there is a file having a page count that is less than the page count specified by the user (step S9).

If there is no file having a page count that is less than the page count specified by the user (i.e., if the determination of step S9 is No), the controller 10 executes transmission of the file.

Meanwhile, if there is a file having a page count that is less than the page count specified by the user (i.e., if the determination of step S9 is Yes), in step S10, the controller 10 creates a combining configuration file, and then attaches the combining configuration file (step S10).

Figure 4:
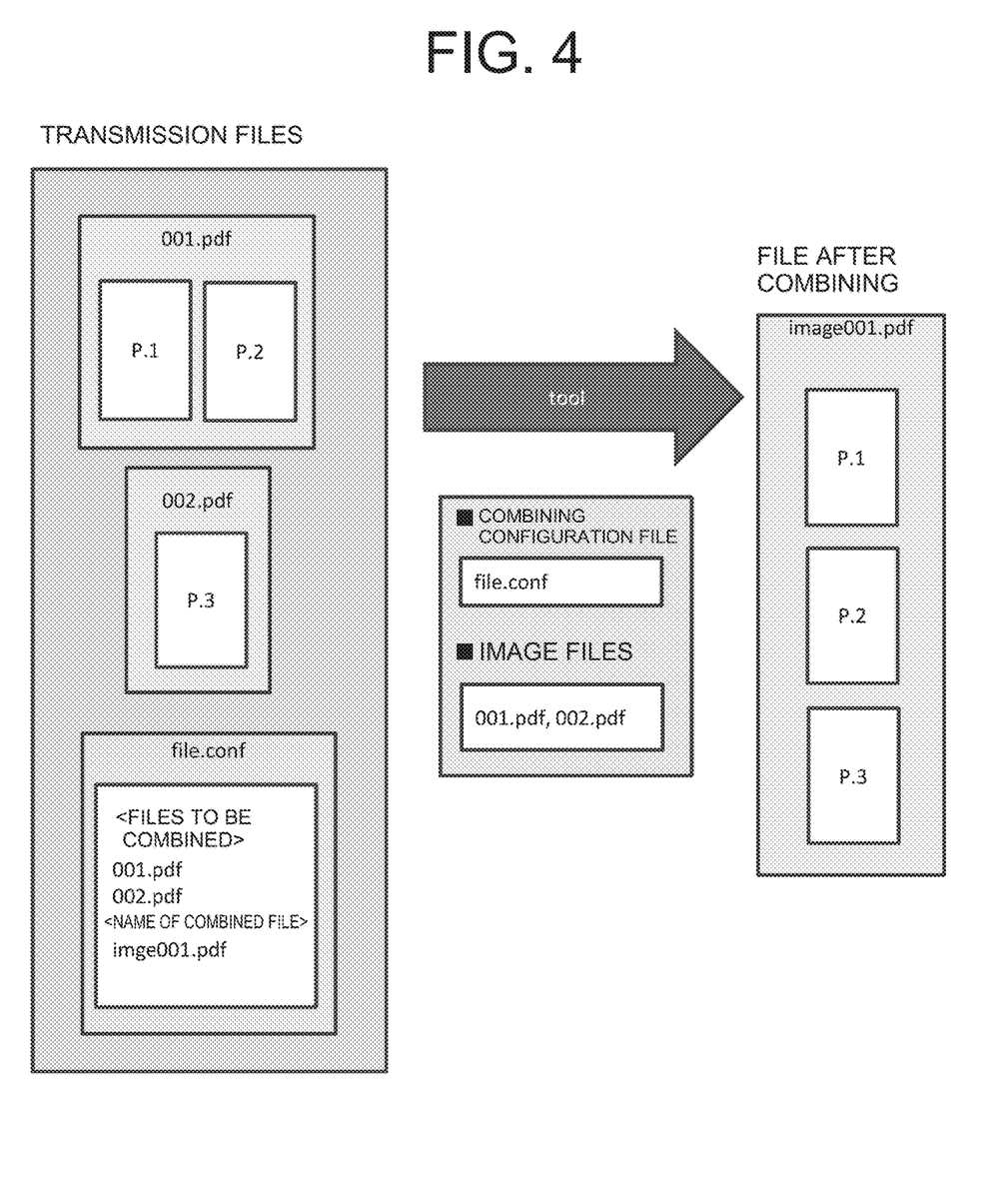
FIG. 4 is an explanatory diagram illustrating an example of transmission files of the digital multifunction peripheral shown in FIG. 1 and a file after combining.

FIG. 4 is an explanatory diagram illustrating an example of transmission files of the digital multifunction peripheral 1 shown in FIG. 1 and a file after combining.

The example shown in FIG. 4 assumes a case where two files of less than three pages, i.e., an image file "001.pdf" of two pages, and an image file "002.pdf" of one page, are created due to the file exceeding the upper limit value of the file capacity even though the page count as specified by the user is three.

In this case, a combining configuration file "file.conf" for combining these two image files is also attached together.

Further, after the files have been transmitted, a user who has received these three files executes the combining configuration file, and combines the two image files.

As a result, as shown by the illustration indicated as "File after Combining" in FIG. 4, an image file "image001.pdf" of three pages is created.

Next, in step S11 of FIG. 3, the controller 10 determines whether an attachment setting for a file combining tool is enabled or not (step S11).

Figure 5:
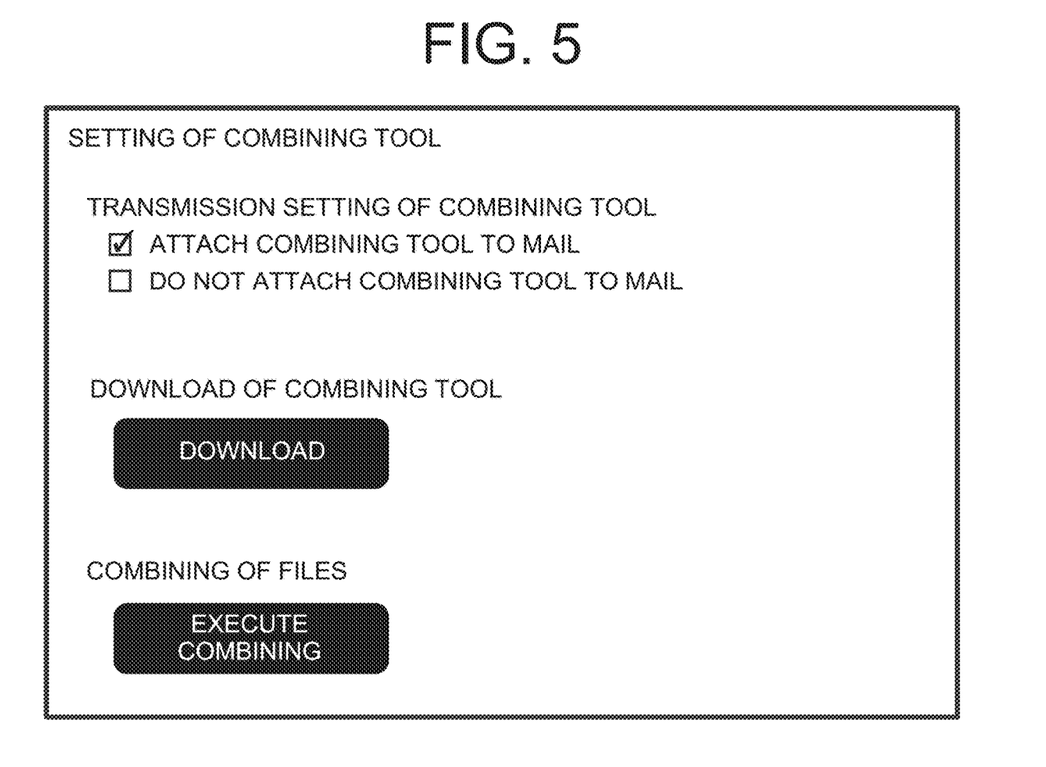
FIG. 5 is an explanatory diagram illustrating an example of a transmission setting/combining Web page for a file combining tool of the digital multifunction peripheral shown in FIG. 1.

FIG. 5 is an explanatory diagram illustrating an example of a transmission setting/combining Web page for a file combining tool of the digital multifunction peripheral 1 shown in FIG. 1.

As illustrated in FIG. 5, as "Transmission Setting for Combining Tool", the user puts a check in either box representing "Attach Combining Tool to Mail" or "Do not Attach Combining Tool to Mail".

Also, the user can download the combining tool by pressing a "Download" button.

Furthermore, the user can combine the files by pressing an "Execute Combining" button.

In step S11 of FIG. 3, if the attachment setting for a combining tool is enabled (i.e., if the determination of step S11 is Yes), in step S12, the controller 10 attaches the combining tool to a transmission mail (step S12), and executes transmission of the files.

Figure 6:
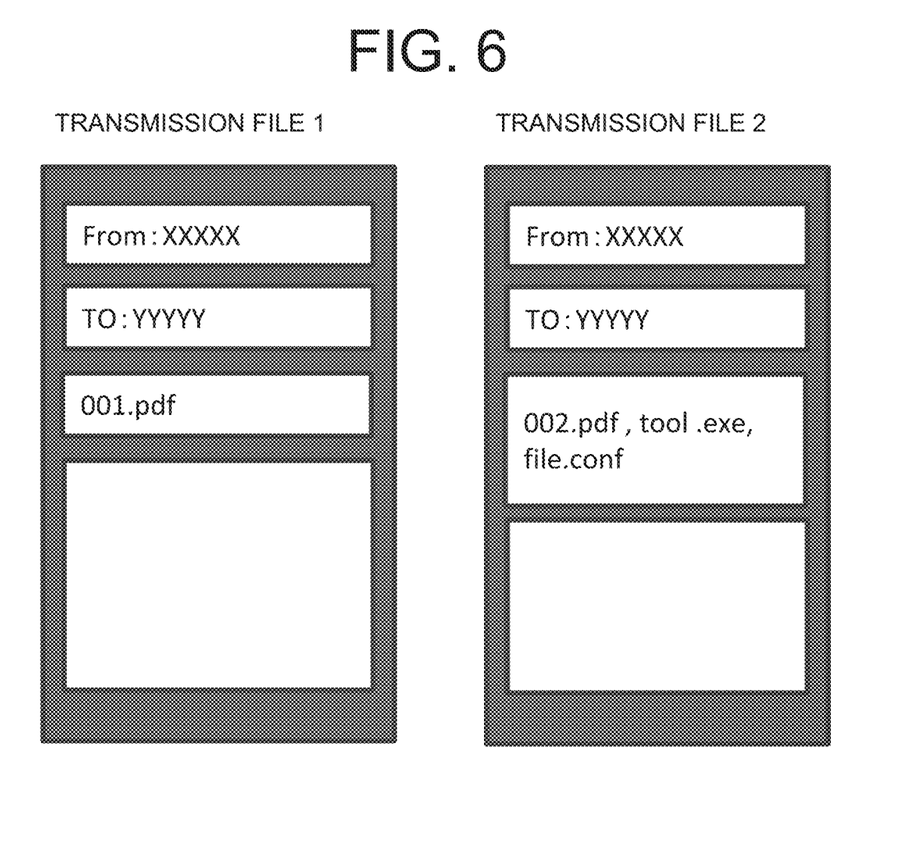
FIG. 6 is an explanatory diagram illustrating an example of transmission files of the digital multifunction peripheral shown in FIG. 1.

FIG. 6 is an explanatory diagram illustrating an example of transmission files of the digital multifunction peripheral 1 shown in FIG. 1.

As illustrated in FIG. 6, the image files "001.pdf" and "002.pdf", which are the two divided files, are transmitted as transmission file 1 and transmission file 2, respectively, in a divided way.

Furthermore, the combining configuration file "file.conf", and the combining tool "tool.exe" are also attached together to transmission file 2.

Figure 7:
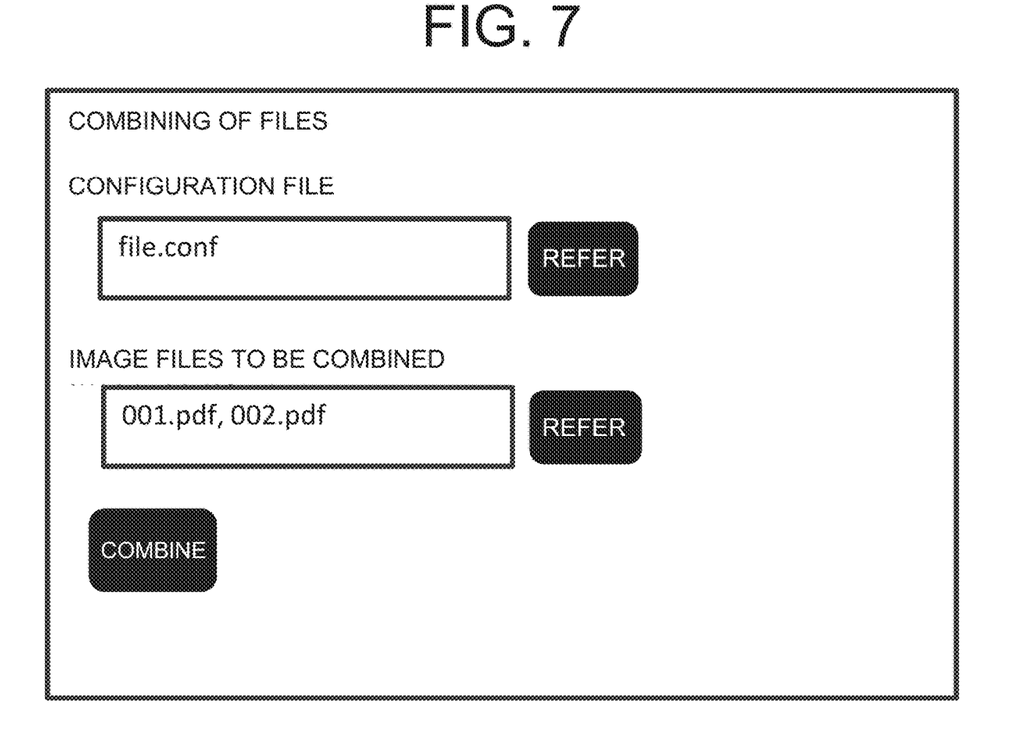
FIG. 7 is an explanatory diagram of an execution screen of a combining tool attached to a transmission file of the digital multifunction peripheral shown in FIG. 1.

FIG. 7 is an explanatory diagram of an execution screen of the combining tool attached to the transmission file of the digital multifunction peripheral 1 shown in FIG. 1.

In the example shown in FIG. 7, when the user presses a "Combine" button in a state where the configuration file "file.conf" and the image files "001.pdf" and "002.pdf" to be combined, which have been transmitted by e-mail, are specified, combining of the files is executed.

Figure 8:
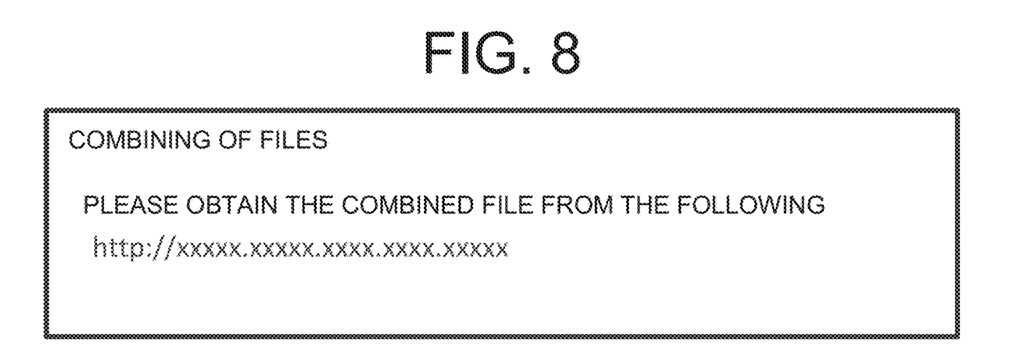
FIG. 8 is an explanatory diagram illustrating an example of a screen to be displayed after executing the combining tool attached to the transmission file of the digital multifunction peripheral shown in FIG. 1.

FIG. 8 is an explanatory diagram illustrating an example of a screen to be displayed after executing the combining tool attached to the transmission file of the digital multifunction peripheral 1 shown in FIG. 1.

As illustrated in FIG. 8, the URL "http://xxxx.xxxxx.xxxx.xxxx.xxxxx" of a page where the combined file is stored is displayed together with the message stated as "Please obtain the combined file from the following".

The user can obtain the combined file "image001.pdf" of the two image files "001.pdf" and "002.pdf" by clicking on the above URL.

Meanwhile, in step S11 of FIG. 3, if the attachment setting for the combining tool is not enabled (i.e., if the determination of step S11 is No), in step S13, the controller 10 indicates the URL of the tool in the text of the transmission mail (step S13), and executes transmission of the files.

Figure 9:
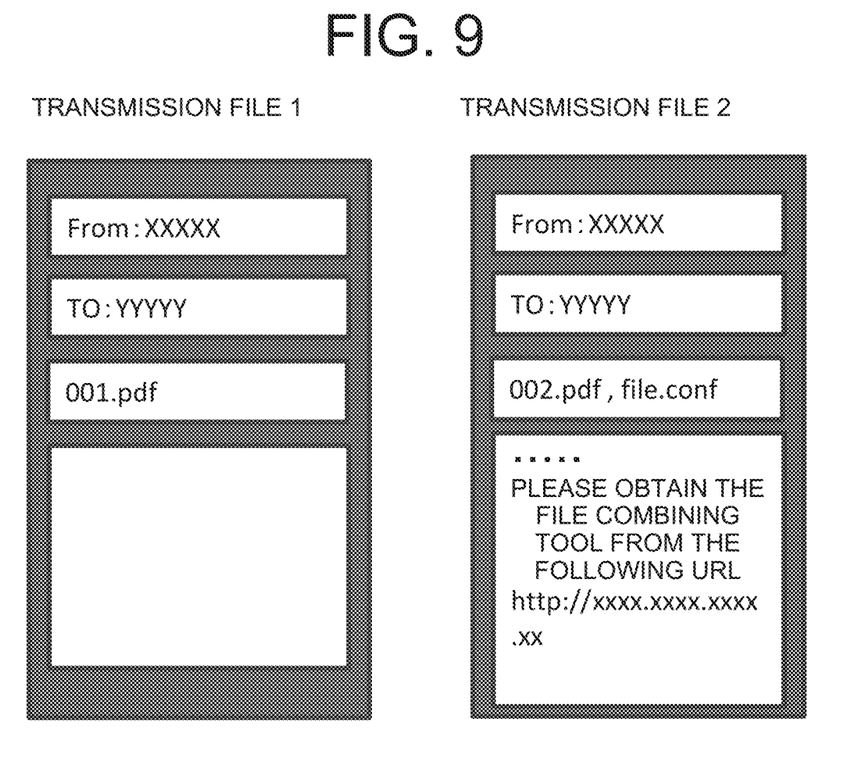
FIG. 9 is an explanatory diagram illustrating another example of the transmission files of the digital multifunction peripheral shown in FIG. 1.

FIG. 9 is an explanatory diagram illustrating another example of the transmission files of the digital multifunction peripheral 1 shown in FIG. 1.

As illustrated in FIG. 9, the image files "001.pdf" and "002.pdf", which are the two divided files, are transmitted as transmission file 1 and transmission file 2, respectively, in a divided way.

Furthermore, the combining configuration file "file.conf" is also attached together to transmission file 2.

In addition, the URL "http://xxxx.xxxx.xxxx.xx" is indicated with the message "Please obtain the file combining tool from the following URL" stated in a mail text of transmission file 2.

The user can obtain the combining tool for the two image files "001.pdf" and "002.pdf" by clicking on the above URL.

In this way, it is possible to realize the digital multifunction peripheral 1 which enables a recipient to obtain a transmission file of a page count set by a sender even in a case where the transmission file must be divided due to the file exceeding an upper limit of a transmittable file capacity.

Embodiment 2

Figure 10:
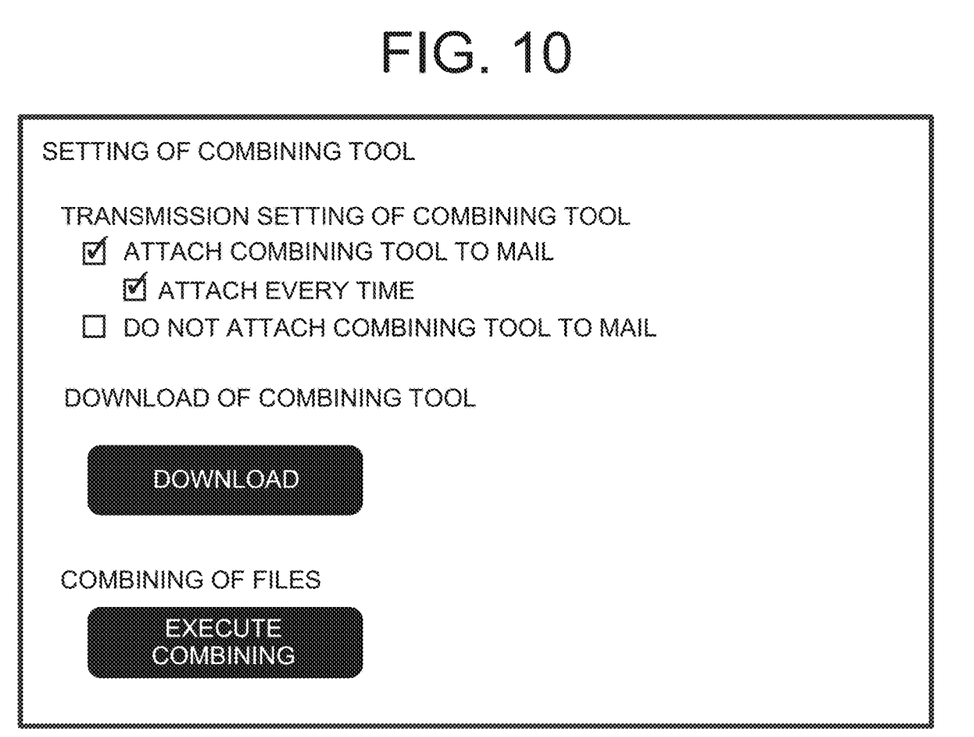
FIG. 10 is an explanatory diagram illustrating an example of a transmission setting/combining Web page for a file combining tool of a digital multifunction peripheral according to Embodiment 2 of the present invention.

As a file transmission setting of a digital multifunction peripheral 1 according to Embodiment 2 of the present invention, as illustrated in FIG. 10, the digital multifunction peripheral 1 may be configured such that a sender can set whether or not to transmit a file combining tool for each instance of transmission.

If the user has made the setting that the combining tool should be transmitted together, the controller 10 causes the communicator 15 to transmit the combining tool for each instance of transmission.

Meanwhile, if the user has made the setting of not transmitting the combining tool together, instead of transmitting the combining tool, the URL "http://xxxx.xxxx.xxxx.xx" is indicated with the message "Please obtain the file combining tool from the following URL" stated in a mail text of the transmission file.

In this case, the combining configuration file "file.conf" is also attached together to the mail transmitted.

When the combining tool is to be downloaded, a usage environment of an apparatus connected to the URL may be taken into account, and a combining tool suitable for the usage environment may be automatically selected.

In this way, it is possible to realize the digital multifunction peripheral 1 which transmits files such that a recipient can obtain a file of a page count specified by a user even in a case where the file exceeds an upper limit of a transmittable file capacity, in which a sender can set whether or not to transmit the file combining tool for each instance of transmission.

Embodiment 3

As a file transmission setting of a digital multifunction peripheral 1 according to Embodiment 3 of the present invention, a function whereby the files can be combined in the main body of the digital multifunction peripheral 1 may be provided.

In this case, on a Web page of the main body of the digital multifunction peripheral 1, a page where a configuration file for file combining, and files to be combined can be specified is displayed on a display 171.

The user specifies the configuration file for file combining, and the files to be combined on the Web page as described above.

The controller 10 reads the combining configuration file specified by the user, combines the files to be combined with each other, and sets a file name after combining, and then causes the display 171 to display the URL from which the user can download the combined file.

As the user specifies the aforementioned URL, the user can download the combined file.

In this way, it is possible to realize the digital multifunction peripheral 1 which transmits files such that a recipient can obtain a file of a page count specified by a user even in a case where the file exceeds an upper limit of a transmittable file capacity, in which after reception of the files, the files to be combined are specified on a Web page of the main body of the digital multifunction peripheral 1, and a combined file can be downloaded from a prescribed URL.

Embodiment 4

As a Web service of a digital multifunction peripheral 1 according to Embodiment 4 of the present invention, a function whereby files such as PDF files can be combined may be provided together.

For example, by drag-and-drop of files transmitted by e-mail, and a configuration file transmitted together, combining of the files according to the transmitted configuration file is made possible.

In this way, it is possible to realize the digital multifunction peripheral 1 which transmits files such that a recipient can obtain a file of a page count specified by a user even in a case where the file exceeds an upper limit of a transmittable file capacity, in which after reception of the files, the files can be combined by a Web service provided together.

The preferred modes of the present invention also include a combination of any of the above-described modes.

Various modifications of the present invention may be implemented besides the above-described embodiments. Such modifications should not be construed as falling outside the scope of the present invention. The present invention is embodied by the claims and their equivalents, and should embrace all of the modifications within the scope of the above.

What is claimed is:

1. A communication device comprising:
   a transmission file setter which sets an upper limit value of a file capacity transmittable by e-mail;
   a transmission page setter which sets a page count of a transmission file;
   a communicator which divides, when a transmission file including a plurality of number of pages exceeds the upper limit value of the file capacity, the transmission file into a plurality of divided transmission files whose capacity does not exceed the upper limit value, and transmits the plurality of divided transmission files to a specified address;
   a transmission setter which receives a combining configuration file for combining the plurality of divided transmission files, and a setting of a combining tool; and
   a controller which controls the transmission file setter, the transmission page setter, and the communicator, wherein
   when the communicator divides the transmission file and transmits the plurality of divided transmission files to the specified address, the controller causes the communicator to also transmit the combining configuration file and the combining tool for creating a file of the page count set by the transmission page setter, in accordance with the setting of the transmission setter.

2. The communication device according to claim 1, wherein the controller causes the communicator to also transmit, to the specified address, address information of a website from which the combining configuration file and the combining tool are obtainable, in accordance with the setting of the transmission setter.

3. The communication device according to claim 1, wherein the transmission setter receives, when the communicator divides the transmission file and transmits the plurality of divided transmission files, a setting of whether to transmit the combining tool for each instance of transmission.

4. The communication device according to claim 1, further comprising a storage which stores the combining tool in a way that is accessible from outside.

5. The communication device according to claim 1, further comprising:
   a storage which stores the combining configuration file and the combining tool;
   a display which displays a page where the combining configuration file and the combining tool are specifiable; and
   an operator which receives an operation of a user, wherein when the communicator receives the plurality of divided transmission files, the display is made to display the page where the combining configuration file and the combining tool are specifiable, and the plurality of divided transmission files are combined based on the operation of the user.

6. A communication method comprising:
   transmission file setting of setting an upper limit value of a file capacity transmittable by e-mail;
   transmission page setting of setting a page count of a transmission file;
   division transmission of dividing, when a transmission file including a plurality of number of pages exceeds the upper limit value of the file capacity, the transmission file into a plurality of divided transmission files whose capacity does not exceed the upper limit value, and transmitting the plurality of divided transmission files to a specified address; and
   transmission setting of receiving a combining configuration file for combining the plurality of divided transmission files, and a setting of a combining tool, wherein
   in the division transmission, when the transmission file is divided and the plurality of divided transmission files are transmitted to the specified address, the combining configuration file and the combining tool for creating a file of the page count set in the transmission page setting are also transmitted, in accordance with the setting of the transmission setting.

* * * * *